United States Patent
Kantarovich et al.

(10) Patent No.: US 8,448,912 B2
(45) Date of Patent: May 28, 2013

(54) RETAINERS AND METHODS OF ATTACHING THEREOF

(76) Inventors: Alexander Kantarovich, Long Grove, IL (US); Leonid Danushevsky, Riverwoods, IL (US)

( * ) Notice: Subject to any disclaimer, the term of this patent is extended or adjusted under 35 U.S.C. 154(b) by 806 days.

(21) Appl. No.: 11/821,595

(22) Filed: Jun. 22, 2007

(65) Prior Publication Data

US 2008/0061209 A1 Mar. 13, 2008

Related U.S. Application Data

(60) Provisional application No. 60/805,557, filed on Jun. 22, 2006.

(51) Int. Cl.
*F16M 13/00* (2006.01)

(52) U.S. Cl.
USPC ............. 248/546; 248/216.1; 248/217.3

(58) Field of Classification Search
USPC ......... 248/546, 100, 126, 156, 216.1, 216.4, 248/217.2, 217.3
See application file for complete search history.

(56) References Cited

U.S. PATENT DOCUMENTS

| | | | | |
|---|---|---|---|---|
| 580,975 A * | 4/1897 | Hanson | ............... | 16/4 |
| 919,631 A * | 4/1909 | Page | ............... | 411/471 |
| 1,079,617 A * | 11/1913 | Tennie | ............... | 40/584 |
| 1,246,140 A * | 11/1917 | Moritz | ............... | 248/211 |
| 1,289,130 A * | 12/1918 | Duncan | ............... | 248/470 |
| 1,494,527 A * | 5/1924 | Bieder | ............... | 248/126 |
| 1,667,211 A * | 4/1928 | Light | ............... | 248/216.4 |
| 2,770,436 A * | 11/1956 | Linhardt, Jr. | ............... | 248/57 |
| 3,981,050 A | 9/1976 | Dauphinais | | |
| 4,089,075 A | 5/1978 | May | | |
| 4,112,815 A * | 9/1978 | Tanaka | ............... | 411/512 |
| 4,222,318 A * | 9/1980 | Patton et al. | ............... | 454/209 |
| 4,238,098 A * | 12/1980 | Siegfried et al. | ............... | 248/217.2 |
| 4,249,763 A * | 2/1981 | Provencher et al. | ............... | 294/19.1 |
| 4,425,690 A | 1/1984 | Fraser et al. | | |
| 4,860,402 A * | 8/1989 | Dichtel | ............... | 16/4 |
| 4,901,961 A | 2/1990 | Gish | | |
| 4,920,618 A | 5/1990 | Iguchi | | |
| 5,048,788 A * | 9/1991 | Lorincz | ............... | 248/477 |
| 5,148,581 A | 9/1992 | Hartmann | | |
| 5,328,139 A | 7/1994 | Barnes | | |
| 5,588,629 A * | 12/1996 | Barnes | ............... | 248/475.1 |
| D438,452 S | 3/2001 | Tsai | | |
| 6,412,142 B1 | 7/2002 | Iverson | | |
| 6,585,205 B2 * | 7/2003 | Beaty et al. | ............... | 248/218.1 |
| 6,840,489 B2 * | 1/2005 | Barnes | ............... | 248/475.1 |
| 7,360,745 B2 * | 4/2008 | Nikayin et al. | ............... | 248/216.1 |
| 7,644,895 B2 * | 1/2010 | Tseng | ............... | 248/126 |
| 2004/0211874 A1 | 10/2004 | Barnes | | |

* cited by examiner

*Primary Examiner* — Bradley Duckworth

(57) ABSTRACT

A retainer has an arm support portion and at least three arms extending from the arm support portion. The at least three arms are resiliently flexible. A grip member is provided on each one of the at least three arms. Each grip member is capable of engagement with a surface. During use of the retainer, the at least three arms are in a flexed or loaded position and each grip member is in engagement with the surface. The at least three arms provide a spring force to the surface through the grip members to securely mount the retainer on the surface. An object can be supported by the retainer.

14 Claims, 8 Drawing Sheets

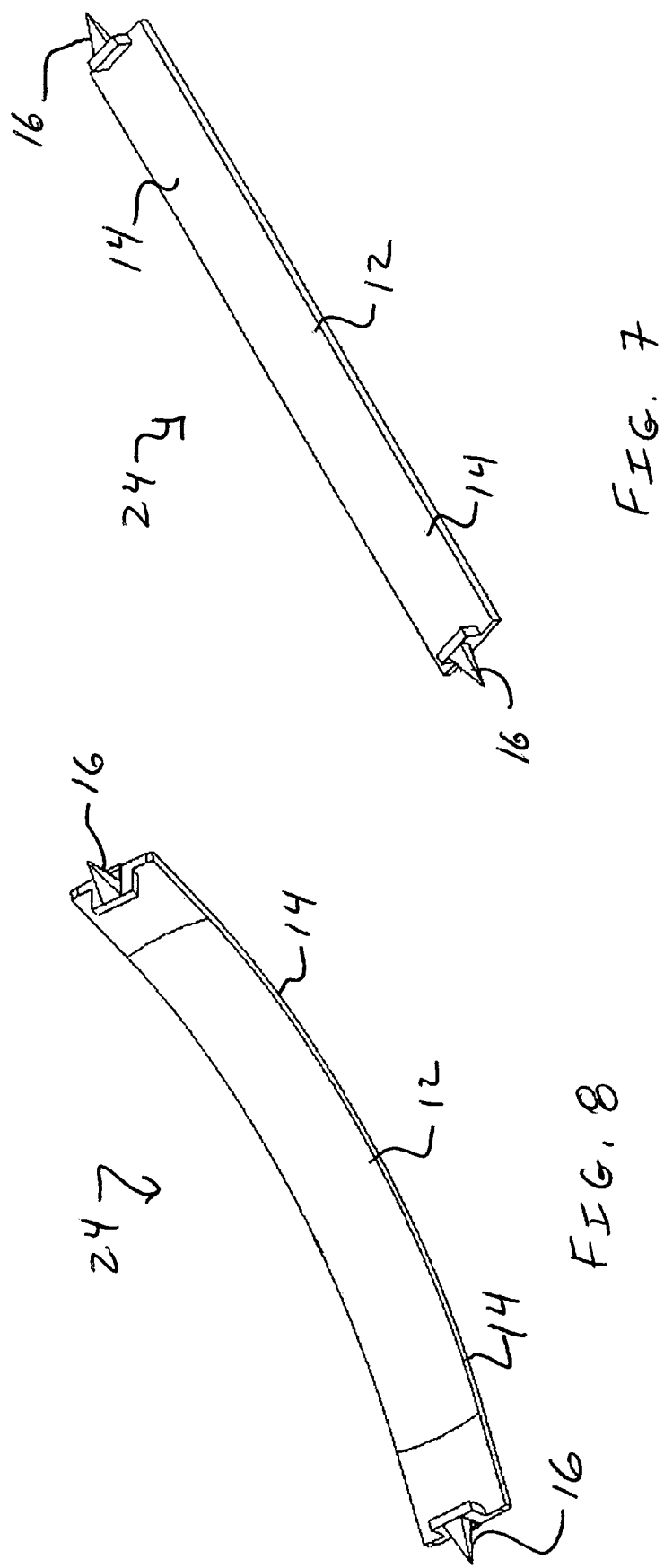

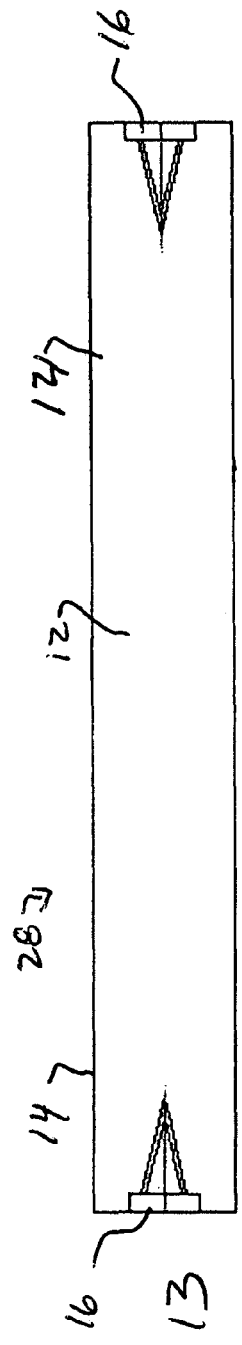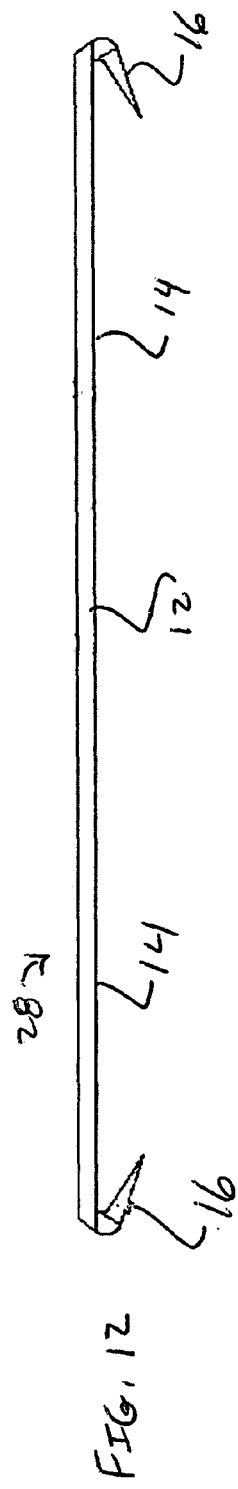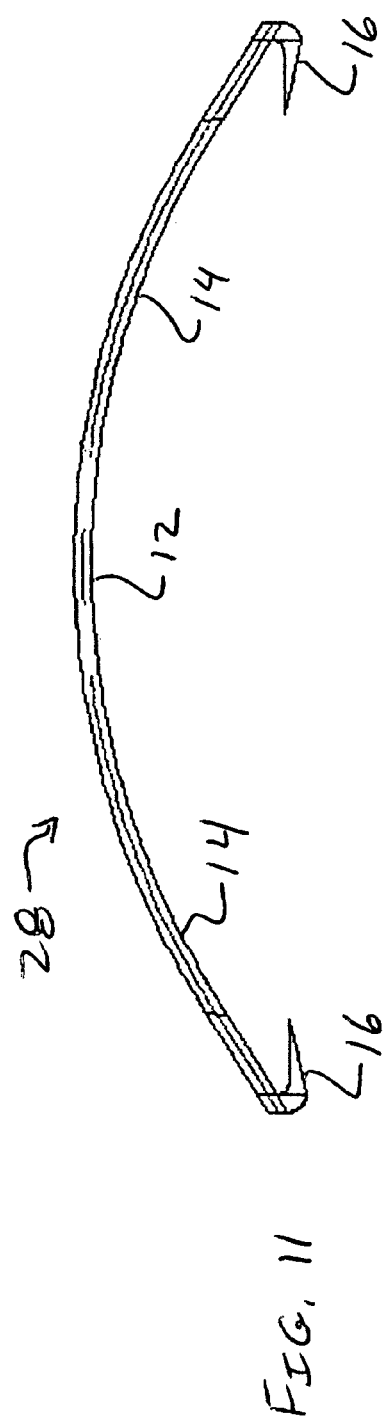

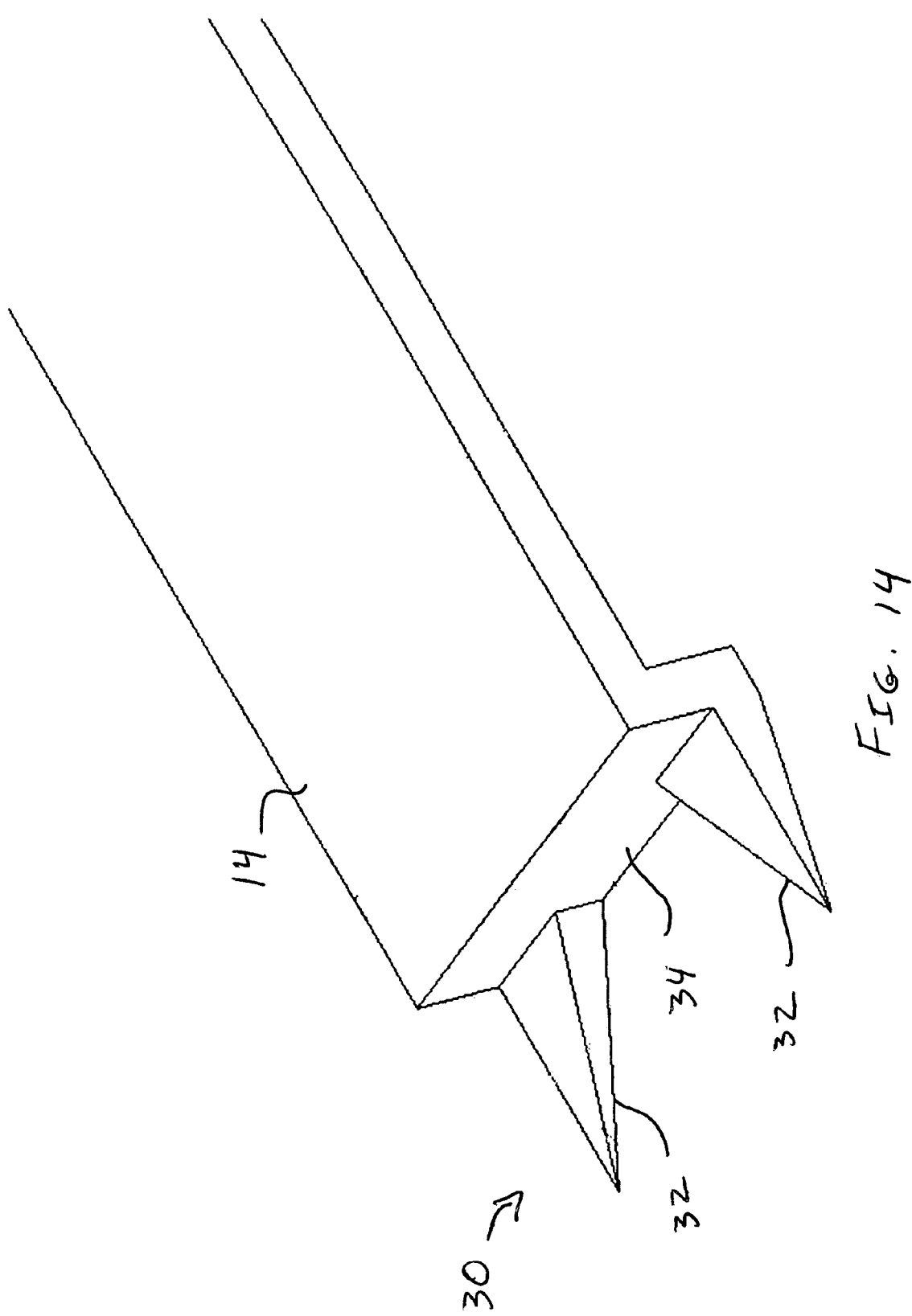

RETAINERS AND METHODS OF ATTACHING THEREOF

CROSS-REFERENCE TO RELATED APPLICATIONS

This application claims priority of provisional application Ser. No. 60/805,557 filed Jun. 22, 2006, incorporated herein by reference.

BACKGROUND OF THE INVENTION

The present invention pertains to retainers which can be removably mounted to a surface. The retainers have flexible, spring-like arms which can be resiliently bent. Grip members on the flexible arms engage the surface and spring force of the resiliently bent arms retains or mounts the retainer on the surface. The retainers can be used for numerous purposes, for example removably mounting objects on a surface.

There are many needs for removably mounting objects to surfaces. For example, there are needs to easily mount objects to surfaces and to easily remove the objects from the surfaces. There are needs to hang signs or objects on walls. There are needs to display advertisements on surfaces. There are needs to hang objects on vertical walls, hang objects below ceilings or other horizontal surfaces, and needs to mount objects above floors or other horizontal surfaces. There are needs to mount objects to surfaces which are not vertical or horizontal. There are needs to mount objects to uneven surfaces and multiple surfaces. Numerous other needs to removably mount objects to surfaces exist as well. Embodiments of the present invention can address those needs and other needs.

Spring-like hanging devices exist. U.S. Pat. No. 5,588,629 describes a wall article hanging device. U.S. Pat. No. 6,840,489 describes a metal frame-containing wall article hanger and method of use.

Improvements can be made to mounting devices, retainers and related methods, including methods of mounting retainers to surfaces.

Accordingly, needs exist to improve mounting devices, retainers and related methods, including methods of mounting retainers to surfaces, for the reasons mentioned above and for other reasons.

SUMMARY OF THE INVENTION

The present invention provides new retainers and related methods. In an embodiment of the present invention, retainers can be removably mounted to a surface. The retainers have flexible, spring-like arms which can be resiliently bent. Grip members on the flexible arms engage the surface and spring force of the resiliently bent arms retains or mounts the retainer on the surface. The retainers are easily mounted to the surface and easily removed from the surface. The retainers can be used for numerous purposes, for example removably mounting objects on a surface. The retainers are improvements over existing hanging devices. Furthermore, the retainers allow for improved related methods, such as methods of use and methods of removably mounting objects to surfaces.

In an embodiment, a retainer has an arm support portion and at least three arms further extending from the arm support portion. The at least three arms are resiliently flexible. A grip member is provided on an end of each one of the at least three arms, each grip member extends further out than an end portion of each arm, and each grip member capable of engagement with a surface. During use of the retainer the at least three arms are in a flexed position and each grip member is in engagement with the surface. The at least three arms provide a spring force to the surface through the grip members.

The at least three arms may be spaced apart from each other at equal or non-equal angles.

The at least three arms may be three, four, five or more arms.

The grip member may be located at an end portion of the arm opposite the arm support portion. The grip member may be one or more spikes.

The retainer may have an object support location capable of supporting an object on the retainer.

In another embodiment, a method of mounting a retainer to a surface provides applying force to at least three flexible arms which are connected together by an arm support portion and resiliently bending the at least three flexible arms, engaging a grip member on each flexible arm with the surface while the flexible arms are bent, releasing the force applied to the at least three flexible arms, and retaining the retainer on the surface by return spring force of the resiliently bent flexible arms and the engagement of the grip members with the surface.

The method may also include mounting an object to the retainer. Mounting an object to the retainer may include mounting the object to the retainer prior to engaging the grip members with the surface. Mounting an object to the retainer may include mounting the object to the retainer after engaging the grip members with the surface.

Applying force to at least three flexible arms which are connected together and resiliently bending the at least three flexible arms may include contacting the at least three flexible arms at an arms support portion with a bending tool and bending the at least three flexible arms against the bending tool.

The method of mounting a retainer to a surface may also include moving an arm support portion into an interior of the bending tool.

Features of the present invention may be described in certain embodiments. However, the present invention is broader than the described embodiments. Embodiments of the present invention may have various features and provide various advantages. Any of the features and advantages of the present invention may be desired, but, are not necessarily required to practice the present invention.

Advantages of the present invention can be to provide new retainers.

Another advantage of the present invention can be to provide new methods related to retainers, such as new methods of mounting retainers to surfaces.

Another advantage of the present invention can be to provide new devices and methods which can easily removably mount objects to surfaces.

A further advantage of the present invention can be to provide new retainers which can be mounted to many different types of surfaces and surfaces having different orientations.

Yet another advantage of the present invention can be to simplify the installation and removal of surface mounting devices.

A further advantage of the present invention is to provide mounting devices which are securely, yet removably, mounted to surfaces.

Another advantage of the present invention is to provide removable surface mounting devices which are stable when mounted to a surface.

Additional features and advantages of the present invention are described in, and will be apparent from, the following Detailed Description of the Invention and the figures.

BRIEF DESCRIPTION OF THE FIGURES

FIG. 7 is a perspective view of another retainer according to the present invention in an unloaded position.

FIG. 8 is a perspective view of the retainer of FIG. 7 in a loaded position.

FIG. 11 is side view of another retainer according to the present invention in an unloaded position.

FIG. 12 is a side view of the retainer of FIG. 11 in the loaded position.

FIG. 13 is a plan view of the retainer of FIG. 11 in the loaded position.

FIG. 14 is an enlarged perspective view of a grip member of the present invention.

DETAILED DESCRIPTION OF THE INVENTION

Figure 1:
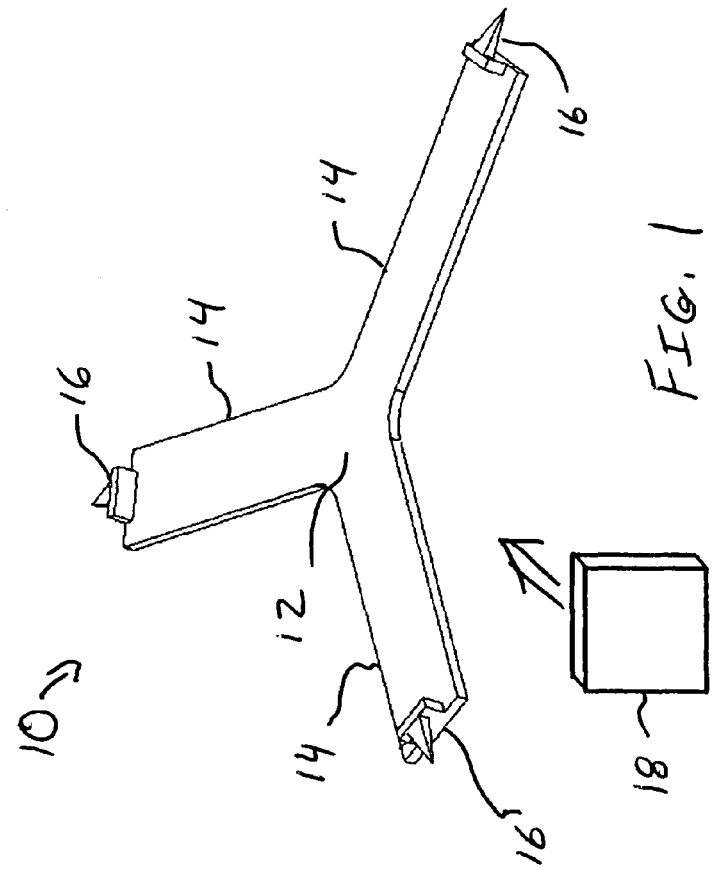
FIG. 1 is a perspective view of a retainer according to the present invention in an unloaded position.
Figure 2:
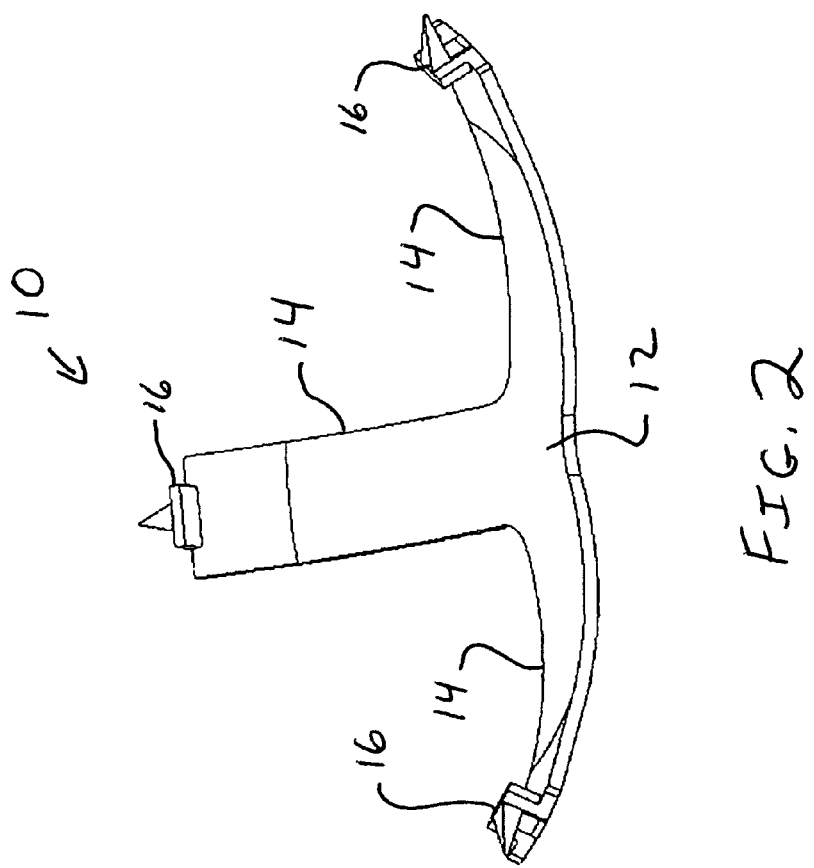
FIG. 2 is a perspective view of the retainer of FIG. 1 in a loaded position.

One example of a retainer 10 according to the present invention is shown in FIGS. 1 and 2. The retainer 10 has an arm support portion 12 and a plurality of flexible arms 14 further extending from an arm support portion. A grip member 16 is provided on each flexible arm 14 and each grip member extends further out than an end portion of each arm. FIG. 1 shows the retainer 10 in an unloaded position and FIG. 2 shows the retainer 10 in a loaded or flexed position. In the loaded position of FIG. 2, at least the flexible arms 14 are resiliently bent or flexed. The arm support portion 12 may also be resiliently bent or flexed. The loaded position of the retainer 10 in FIG. 2 is a flexed position when the retainer is in use and mounted to a surface. The amount of bend or flex can be varied as desired.

The retainer 10 can be made out of any suitable material that provides resilient bending, for example plastic materials and metal materials. The retainer 10 in the loaded position (FIG. 2) acts spring-like and provides spring force to maintain the retainer 10 on the surface to which the retainer 10 is mounted. When the retainer 10 is removed from the surface, the retainer 10 returns to the unloaded position of FIG. 1.

Embodiments of the retainer 10 have at least three flexible arms 14. The flexible arms 14 extend outward away from the arm support portion 12. The flexible arms 14 can have any shape or configuration as desired. The flexible arms 14 provide a spring-like force when bent which maintains the mounting of the retainer 10 on a surface. The flexible arms 14 are shown in FIG. 1 as all being identical to each other. However, the flexible arms 14 can be different from each other, for example the flexible arms 14 can vary in length, position and shape relative to each other.

The retainer 10 of FIGS. 1 and 2 have the flexible arms 14 equally positioned around the arm support portion 12. In other words, the three flexible arms 14 are spaced apart from each other at equal angles. However, the flexible arms 14 can be positioned at any desired location relative to each other and the angles between adjacent flexible arms 14 do not have to be equal. Also, the flexible arms 14 do not have to be positioned at angles around the arm support portion 12. For example, the retainer 10 of FIGS. 1 and 2 could be modified to have two flexible arms 14 extending from the arm support portion 12 parallel to each other and in the same direction, and the third flexible arm 14 extending in an opposite direction from the arm support portion 12.

The grip members 16 provide gripping contact or engagement with the surface that the retainer 10 is mounted on. The grip members 16 are shown as having spikes or points which may, depending on the nature of the surface, penetrate the surface when the retainer 10 is mounted on the surface. However, any other suitable structure for the grip members 16 can be used with various embodiments of the present invention. Some examples of other grip members 16 include, but are not limited to, non-pointed projections, multiple projections per grip member, non-permanent bonding adhesives, textured or rough surfaces, corners, and edges, etc. The grip members 16 may or may not penetrate the surface to which the retainer 10 is mounted. Also, the grip members 16 along with the spring force of the bent flexible arms 14 secure the retainer 10 to the surface and prevent the retainer 10 from changing its position or form.

The grip members 16 are shown in FIGS. 1 and 2 as being located at an end portion of the flexible arms 14 opposite the arm support portion 12. However, the grip members 16 can be positioned at any desired location on the flexible arms 14. Also, more than one grip member 16 can be provided on any one single flexible arm 14. The grip members 16 are shown having spikes pointing in a direction along a longitudinal axis of each flexible arm 14. However, the orientation of the grip member 16 and the spike and be changed, and the grip member 16 can point in other directions.

The retainer 10, or more specifically the grip member 16, may also have attachment structure to prevent reverse movement of the grip member 16 and the retainer 10 after the retainer 10 is mounted to the surface. The grip member 16 has adequate length to provide enough space for incorporating the attachment structure to secure the grip member 16 inside and/or on the opposite side of the surface at the insertion point to prevent reverse movement.

Embodiments of the retainer 10 can be mounted to many different types of surfaces. For example, embodiments of the retainer 10 can be used with fabric surfaces, leather surfaces, cardboard surfaces, drywall surfaces, hard surfaces, soft surfaces, smooth surfaces, contoured or uneven surfaces, penetrable surface, non-penetrable surfaces, plastic surfaces, paper surfaces, wood surfaces, metal surfaces, and single and multi-layered surfaces. Of course these are only examples of surfaces, and the present invention can be used with other surfaces as well. Embodiments of the retainers of the present invention can be mounted to a surface which includes multiple surfaces close together. For example, the retainer 10 could be mounted to two walls at the corner where the two walls meet, both interior and exterior corners. Similarly, the retainer 10 could be mounted to the area of a corner where two walls and a ceiling meet, such that a resilient arm 14 is engaged with each of the two walls and the ceiling. The retainer 10 can be used to mount to a surface when there is access to only one side of the surface. The retainer 10 can be mounted to the surface without the need to have access to an opposite side of the surface.

The retainer 10 is capable of supporting an object 18 during use of the retainer 10. FIG. 1 schematically and generically shows an object 18 with an arrow pointing toward the retainer 10. The object 18 can be any object as desired. When the retainer 10 is mounted on a surface, the retainer 10 can support the object 18 and thus, mount the object 18 to the surface. The retainer 10 can support the object 18 at any desired location on the retainer 10, for example at the arm support portion 14 or the arms 14. The retainer 10 can be permanently connected to the object 18 or temporarily connected to the object 18. Any suitable mechanism can be used to support the object 18 on or connect the object 18 to the retainer 10. For example, without limitation, threaded fasteners, pins, welding, soldering, glue, wire, rope, sewing, adhesives, clips, fasteners, rivets, ultrasonic welding, hook and loop surface fasteners, suction cups, and hangers, etc. can be used to connect the object 18 to the retainer 10. The retainer 10 can have a hole, notch or any other structure to connect the retainer 10 to the object 18. The retainer 10 could even be connected to the object 18 simply by being in contact with the object 18 without a positive fastening mechanism. Even another retainer according to the present invention can be mounted on the retainer 10 if desired.

The object 18 can be connected to the retainer 10 when the retainer 10 is in the unloaded position of FIG. 1 or when the retainer 10 is in the loaded position of FIG. 2. The object 18 can be connected to the retainer 10 prior to or after the retainer 10 is mounted to the surface.

Embodiments of the retainer 10 can be used for numerous applications and the retainer 10 can support numerous different objects 18. Some examples include, without limitation, hanging objects on walls, hanging pictures on walls, supporting advertising or promotional materials on displays, supporting signs on surfaces, hanging objects from ceilings, supporting tools on a surface, and resisting or preventing movement of the object.

Figure 3:
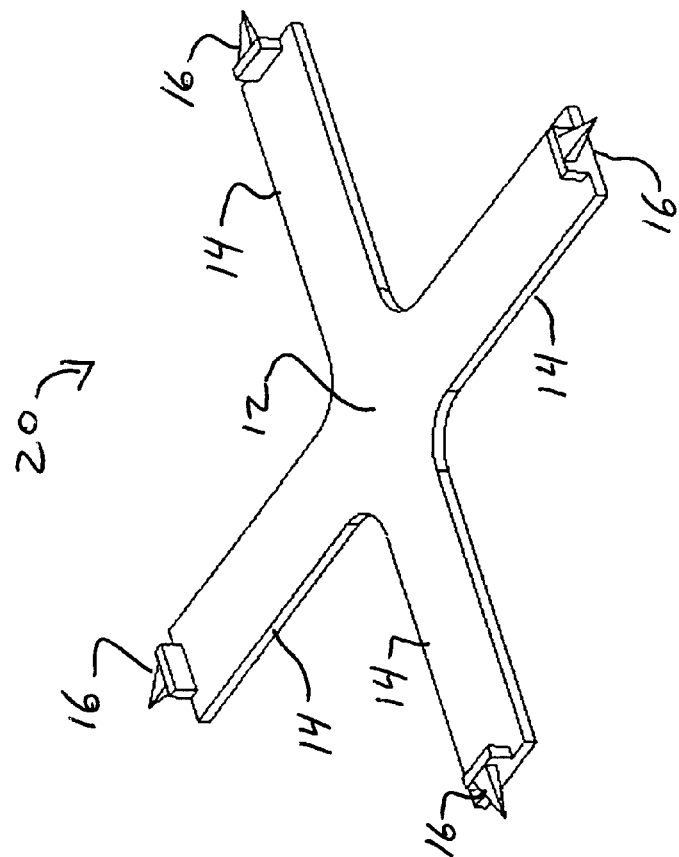
FIG. 3 is a perspective view of another retainer according to the present invention in an unloaded position.
Figure 4:
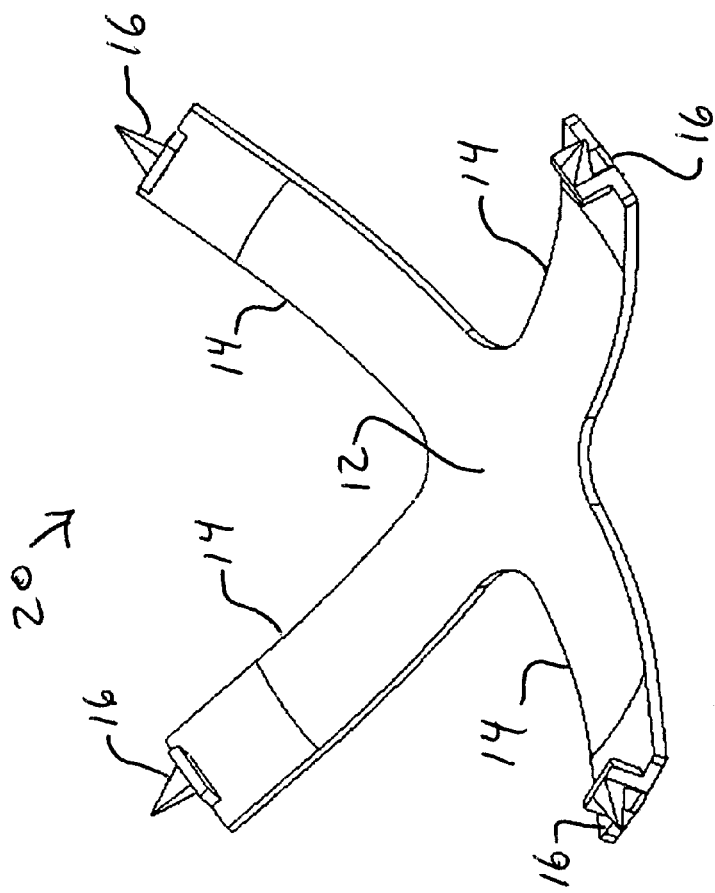
FIG. 4 is a perspective view of the retainer of FIG. 3 in a loaded position.
Figure 5:
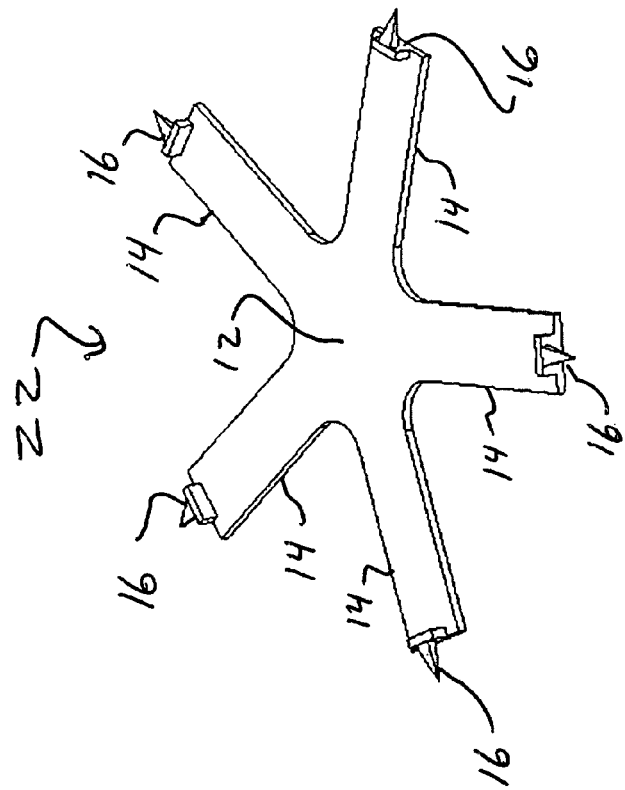
FIG. 5 is a perspective view of another retainer according to the present invention in an unloaded position.
Figure 6:
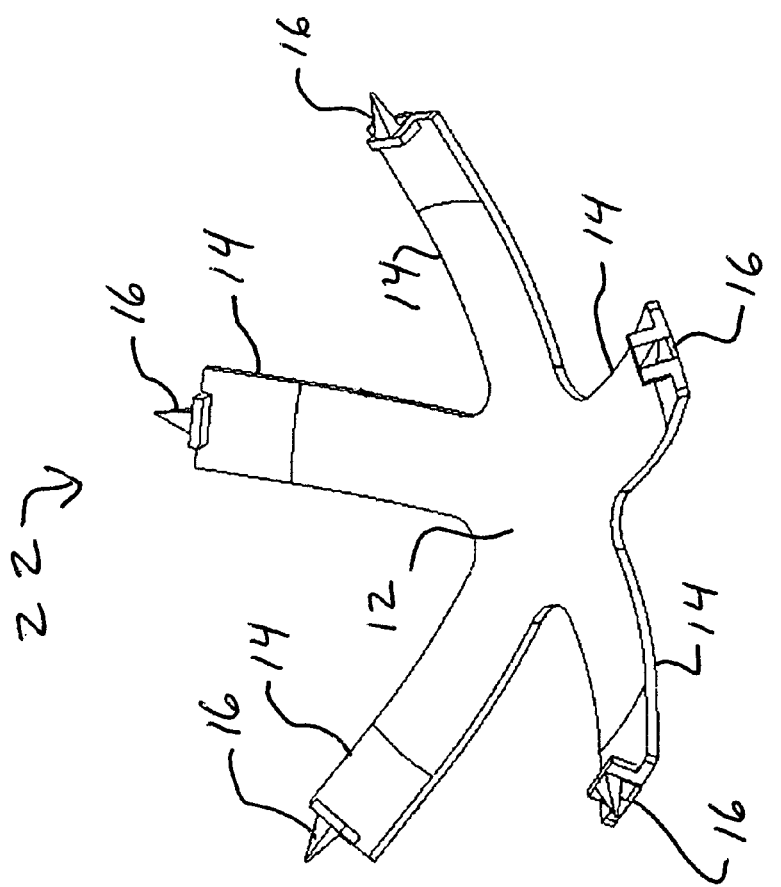
FIG. 6 is a perspective view of the retainer of FIG. 5 in a loaded position.
Figure 9:
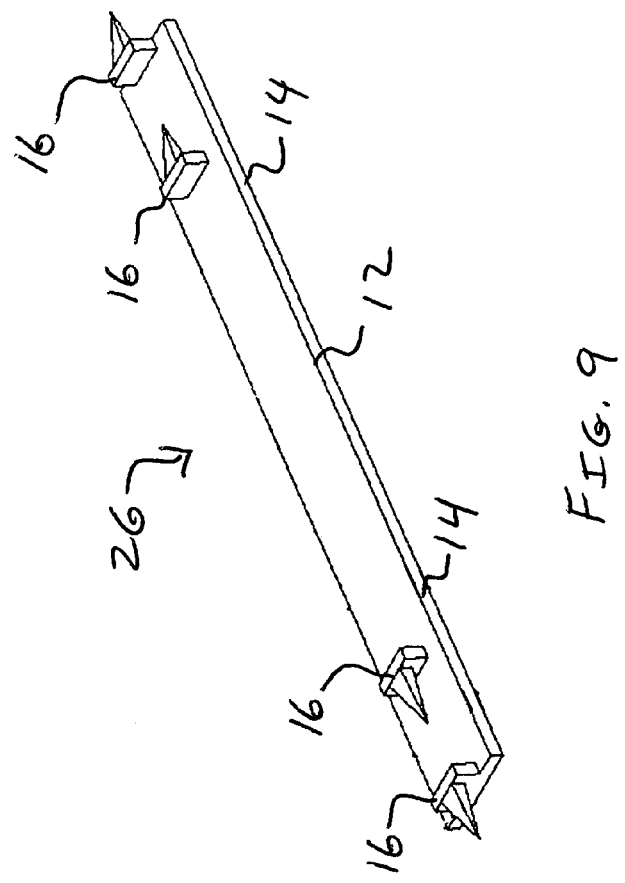
FIG. 9 is a perspective view of another retainer according to the present invention in an unloaded position.
Figure 10:
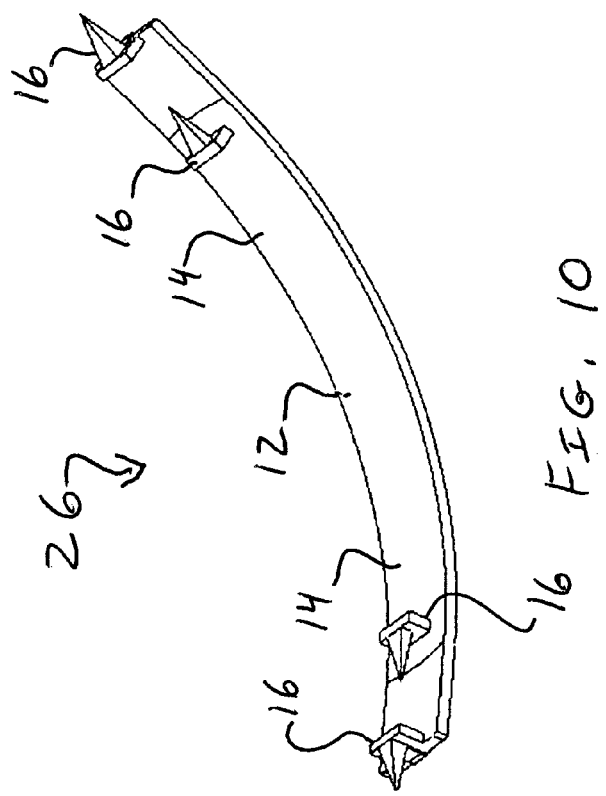
FIG. 10 is a perspective view of the retainer of FIG. 9 in a loaded position.

FIGS. 4-13 show examples of alternative embodiments of the present invention. A retainer 20 having four flexible arms 14 is shown in FIG. 3 in the unloaded position. FIG. 4 shows the retainer 20 in the loaded position. A retainer 22 having five flexible arms 14 is shown in FIG. 5 in the unloaded position. FIG. 6 shows the retainer 22 in the loaded position. A retainer 24 having two flexible arms 14 is shown in FIG. 7 in the unloaded position. FIG. 8 shows the retainer 24 in the loaded position. FIG. 9 shows a retainer 26 having two flexible arms in which each flexible arm 14 has more than one grip member 16. FIG. 9 shows the retainer 26 in the unloaded position and FIG. 10 shows the retainer 26 in the loaded position.

The retainers 10, 20, 22, 24, 26 of FIGS. 1-10 are flat or planer in shape when in the unloaded position and curved or non-planer in shape when in the loaded position. Referring to FIGS. 11-13, another retainer 28 according to the present invention has a curved or non-planer shape when in the unloaded position as shown in FIG. 11. The retainer 28 has a flat shape or a less curved shape when in the loaded position. FIGS. 12 and 13 show the retainer 28 having a flat shape in the loaded position. FIGS. 11-13 also show a variation to the grip members 16 in which the grip members 16 point in a different direction compared to the direction of the grip members of FIGS. 1-10.

FIG. 14 shows another grip member 30 according to the present invention. The grip member 30 has multiple insertion members or spikes 32 instead of a single insertion member or spike. Also, FIG. 14 shows the grip member 30 in greater detail. The grip member 30 has a pair of insertion members or spikes 32 extending from a grip member base 34. The correlation between the form and size of each insertion member 32 and the form and size of the grip member base 34 provides adequate stopping of the grip member base 34 at the point of insertion into the surface to which the retainer is being mounted or connected. This ensures the ability for the grip member base 34 to stop its movement in the insertion direction if the grip member base 34 is reached while the insertion member 32 is inserted into the surface to which the retainer is being connected.

Figure 15:
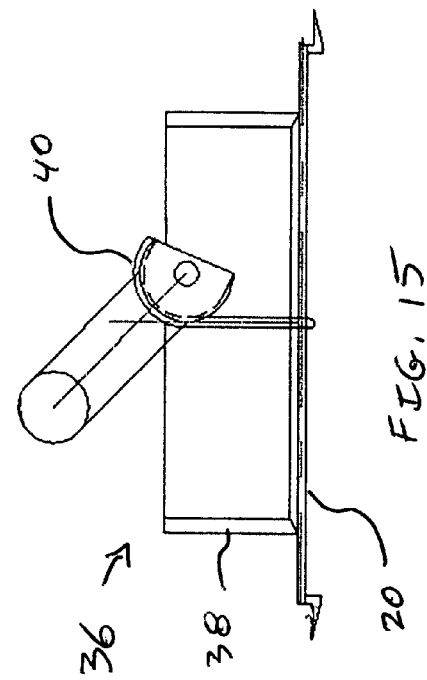
FIG. 15 is a cross-sectional elevational view of a bending tool in use with the retainer of FIGS. 3 and 4.
Figure 16:
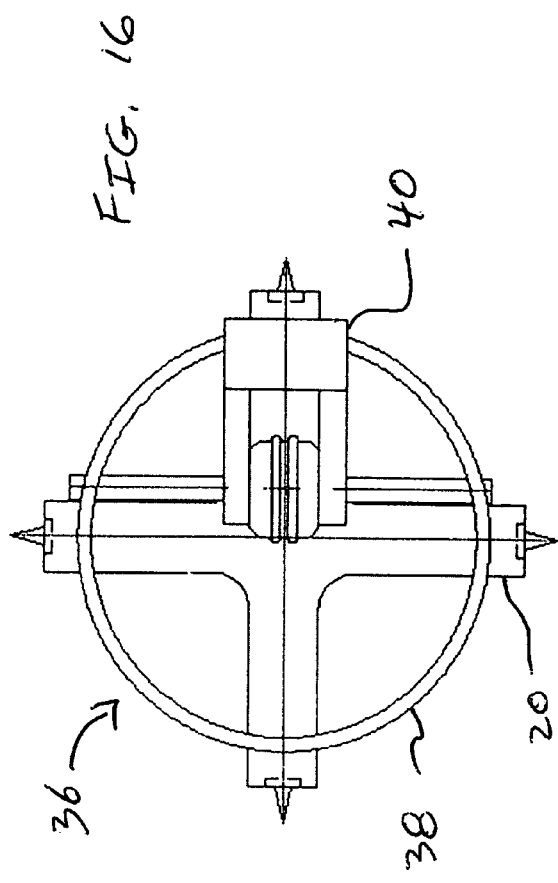
FIG. 16 is a top plan view of the bending tool and retainer of FIG. 15.
Figure 17:
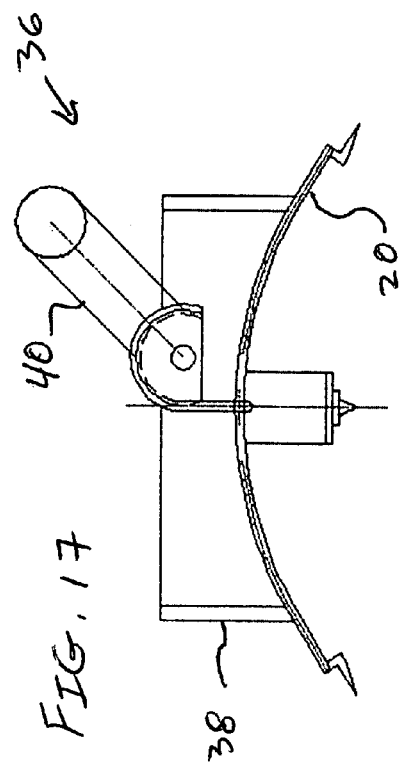
FIG. 17 a cross-sectional elevational view of the bending tool and retainer of FIGS. 15 and 16 during bending of the retainer.

Referring to FIGS. 15-17, a loading tool 36 can be used to place the retainer 20 in the loaded position. The retainer 20 of FIGS. 15-17 is the retainer 20 having four flexible arms of FIGS. 3 and 4. The loading tool 36 has a cylindrical-shaped portion 38 and a retainer moving mechanism 40. The retainer 20 is placed against the loading tool 36 as shown in FIG. 15. The retainer moving mechanism 40 engages the retainer 20 and moves or pulls a portion of the retainer 20, such as the arm support portion 12 and part of the flexible arms 14, into the interior of the cylindrical-shaped portion 38. In this manner, the retainer 20 is bent or flexed to be in the loaded position. The retainer 20 in the loaded position can be placed against the surface and then the retainer moving mechanism 40 releases the retainer 20 to leave the retainer 20 engaged with or mounted to the surface. If desired, the loading tool 36 can be used to remove the retainer 20 from the surface by reversing the procedure. Of course, other loading tools can be used to load and unload the retainers. Also, a loading tool is not necessarily required to use the retainers, and the retainers may be loaded and unloaded by hand.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A retainer, comprising:
   an arm support portion;
   at least three arms further extending from the arm support portion, the at least three arms being resiliently flexible; and
   a grip member on an end of each one of the at least three arms, each grip member capable of engagement with a surface;
   wherein the at least three arms extend away from the arm support portion and are spaced apart such that the spaced-apart arms and the arm support portion define a hub-and-spoke configuration; and
   wherein during use of the retainer the at least three arms are in a flexed position each grip member is in engagement with the surface and the at least three arms provide a spring force to the surface through the grip members.

2. The retainer of claim 1, wherein the at least three arms are spaced apart from each other at equal or non-equal angles.

3. The retainer of claim 1, wherein the at least three arms comprises three arms.

4. The retainer of claim 1, wherein the at least three arms comprises four arms.

5. The retainer of claim 1, wherein the at least three arms comprises five arms.

6. The retainer of claim 1, wherein the grip member is located at an end portion of the arm opposite the arm support portion.

7. The retainer of claim 1, wherein the grip member comprises a spike.

8. The retainer of claim 7, further comprising an object support location on the arm support portion capable of supporting an object on the retainer.

9. A method of mounting a retainer to a surface, comprising:
applying force to at least three flexible arms which are connected together by an arm support portion and resiliently bending the at least three flexible arms;
engaging a grip member on each flexible arm with the surface while the flexible arms are bent;
releasing the force applied to the at least three flexible arms; and
retaining the retainer on the surface by return spring force of the resiliently bent flexible arms and the engagement of the grip members with the surface,
wherein the at least three arms extend away from the arm support portion and are spaced apart such that the spaced-apart arms and the arm support portion define a hub-and-spoke configuration.

10. The method of mounting a retainer to a surface of claim 9, further comprising mounting an object to the retainer.

11. The method of mounting a retainer to a surface of claim 10, wherein mounting an object to the retainer comprises mounting the object to the retainer prior to engaging the grip members with the surface.

12. The method of mounting a retainer to a surface of claim 10, wherein mounting an object to the retainer comprises mounting the object to the retainer after engaging the grip members with the surface.

13. The method of mounting a retainer to a surface of claim 9, wherein applying force to at least three flexible arms which are connected together by an arm support portion and resiliently bending the at least three flexible arms comprises contacting the at least three flexible arms at an arm support portion with a bending tool and bending the at least three flexible arms against the bending tool.

14. The method of mounting a retainer to a surface of claim 13, further comprising moving the arm support portion into an interior of the bending tool.

* * * * *